(12) United States Patent
Allsup

(10) Patent No.: US 6,304,409 B1
(45) Date of Patent: Oct. 16, 2001

(54) ACTIVE DAMPING OF ACTUATOR BEARING TRANSLATIONAL MODE

(75) Inventor: David S. Allsup, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/609,112

(22) Filed: Jun. 30, 2000

Related U.S. Application Data
(60) Provisional application No. 60/141,614, filed on Jun. 30, 1999.

(51) Int. Cl.[7] ................................................ G11B 5/596
(52) U.S. Cl. ...................................... 360/77.03; 360/78.11; 360/265.6
(58) Field of Search .................... 360/75, 77.02, 360/77.03, 78.04, 78.11, 97.02, 97.03, 264, 264.1, 265.2, 265.4, 265.5, 265.6, 265.7

(56) References Cited

U.S. PATENT DOCUMENTS

| | | | |
|---|---|---|---|
| 3,832,897 | * 9/1974 | Schenck | 73/862.31 |
| 4,080,636 | 3/1978 | Ravizza . | |
| 4,477,755 | 10/1984 | Rickert . | |
| 4,605,977 | 8/1986 | Matthews . | |
| 4,812,935 | 3/1989 | Sleger . | |
| 4,933,792 | 6/1990 | Sleger et al. . | |
| 5,296,790 | 3/1994 | Fincher . | |
| 5,426,545 | 6/1995 | Sidman et al. . | |
| 5,452,612 | 9/1995 | Smith et al. . | |
| 5,459,383 | 10/1995 | Sidman et al. | 318/611 |
| 5,491,598 | 2/1996 | Stricklin et al. | 360/265.6 |
| 5,610,777 | 3/1997 | Dang et al. . | |
| 5,663,847 | 9/1997 | Abramovitch . | |
| 5,666,242 | 9/1997 | Edwards et al. | 360/265.6 |
| 5,930,071 | * 7/1999 | Back | 360/265.2 X |
| 6,163,441 | * 12/2000 | Wood et al. | 360/266.1 |

FOREIGN PATENT DOCUMENTS

| | | |
|---|---|---|
| 0 264 535 A2 | 4/1988 | (EP) . |
| 0 560 600 A2 | 9/1993 | (EP) . |

* cited by examiner

*Primary Examiner*—David Hudspeth
*Assistant Examiner*—James L Habermehl
(74) *Attorney, Agent, or Firm*—Crowe & Dunlevy

(57) ABSTRACT

Apparatus and method for improving operational performance of a disc drive by detecting and compensating for translational vibration modes in a disc drive actuator. The actuator is configured to support a head adjacent a recording disc and pivots about a stationary shaft by way of a cartridge bearing assembly having a pair of ball bearing assemblies. A proximity probe detects translational movement of the actuator assembly relative to the shaft due to, for example, abrupt acceleration and deceleration of the head during a seek operation, or externally applied mechanical shocks. The output of the proximity probe is used to generate a bearing translation signal which is fed into an actuator control servo circuit to modify the amount of current applied to an actuator motor to compensate for the translational vibrations during track following and seek operations.

17 Claims, 10 Drawing Sheets

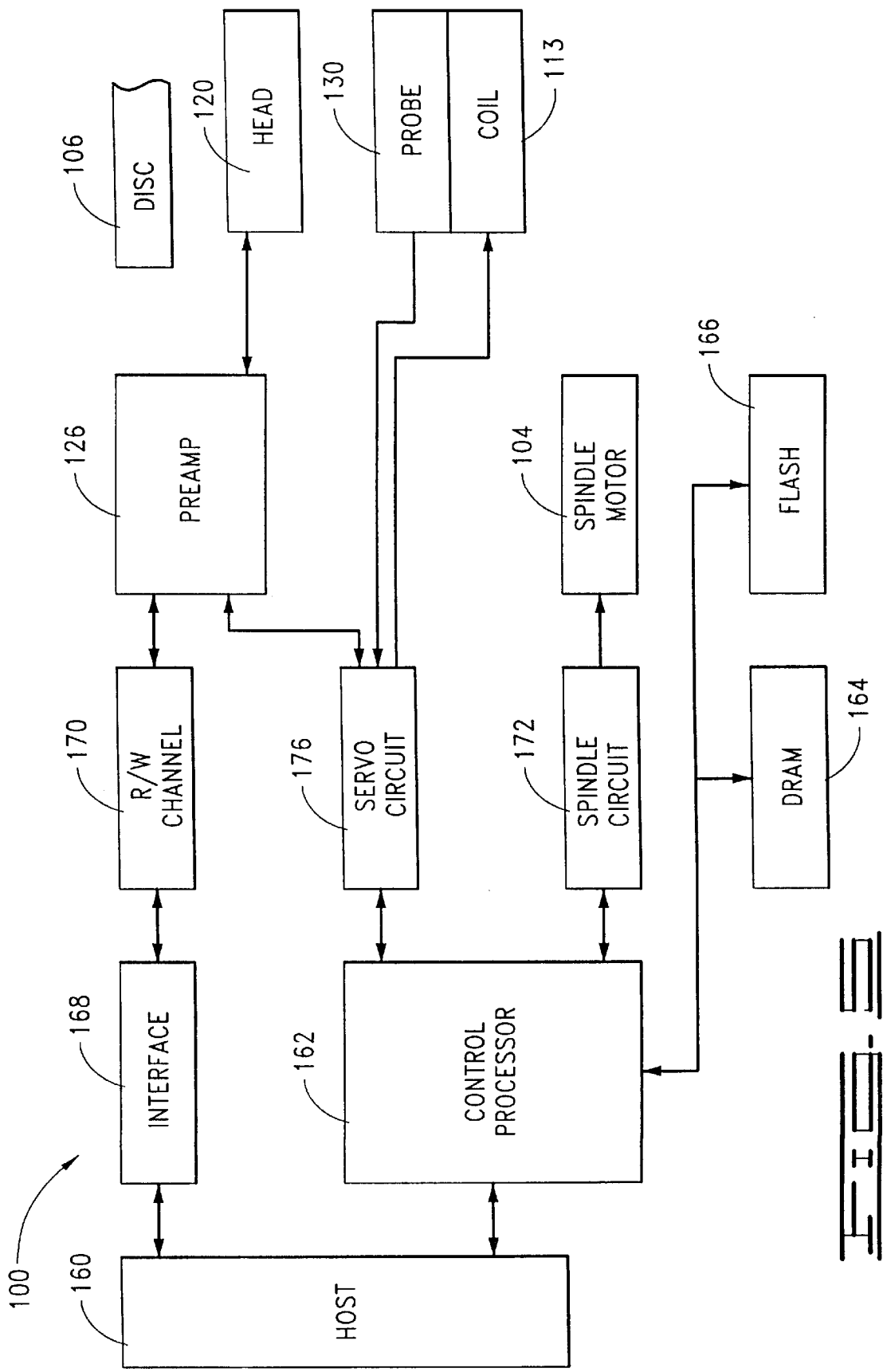

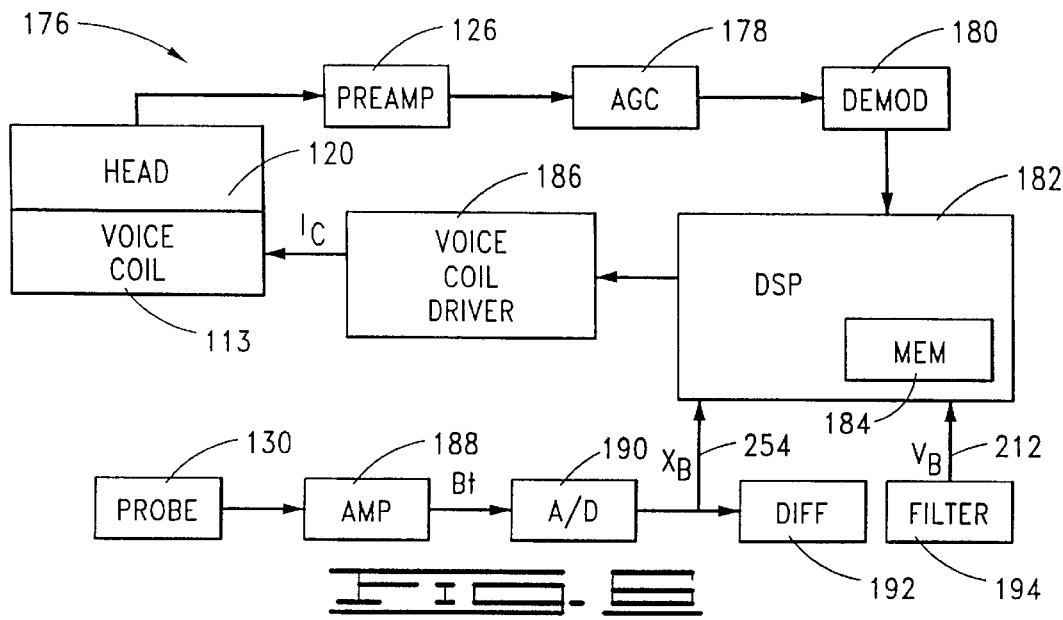
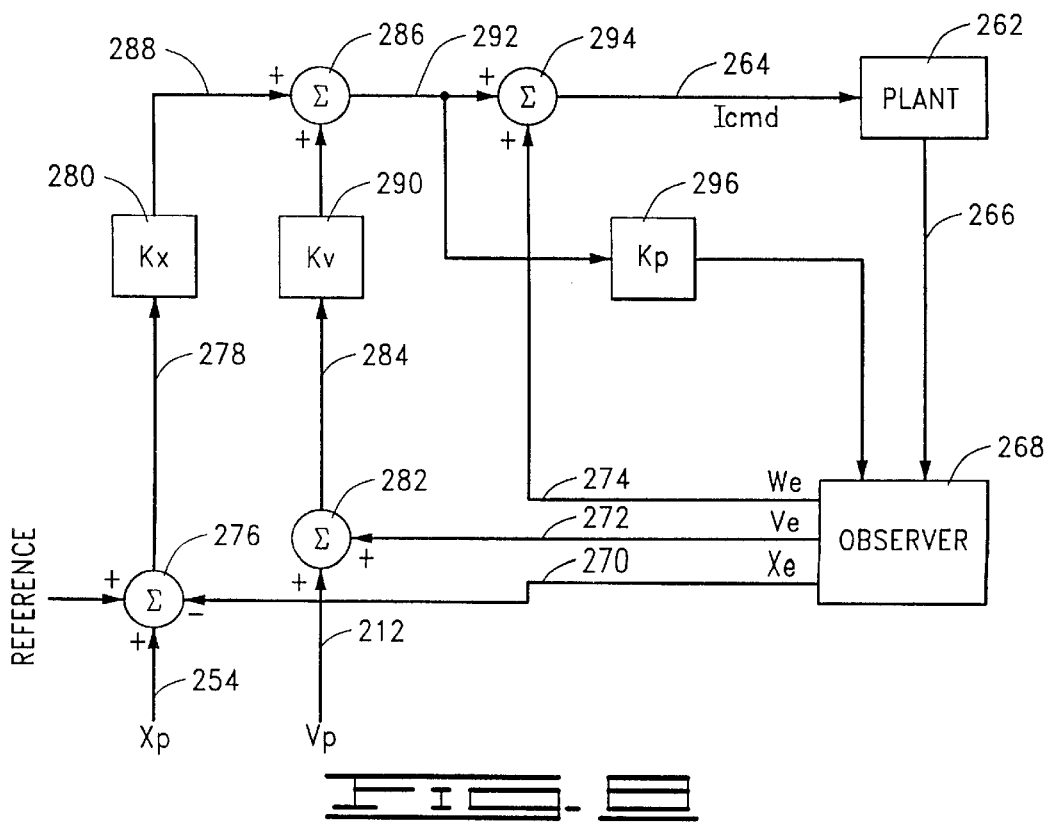

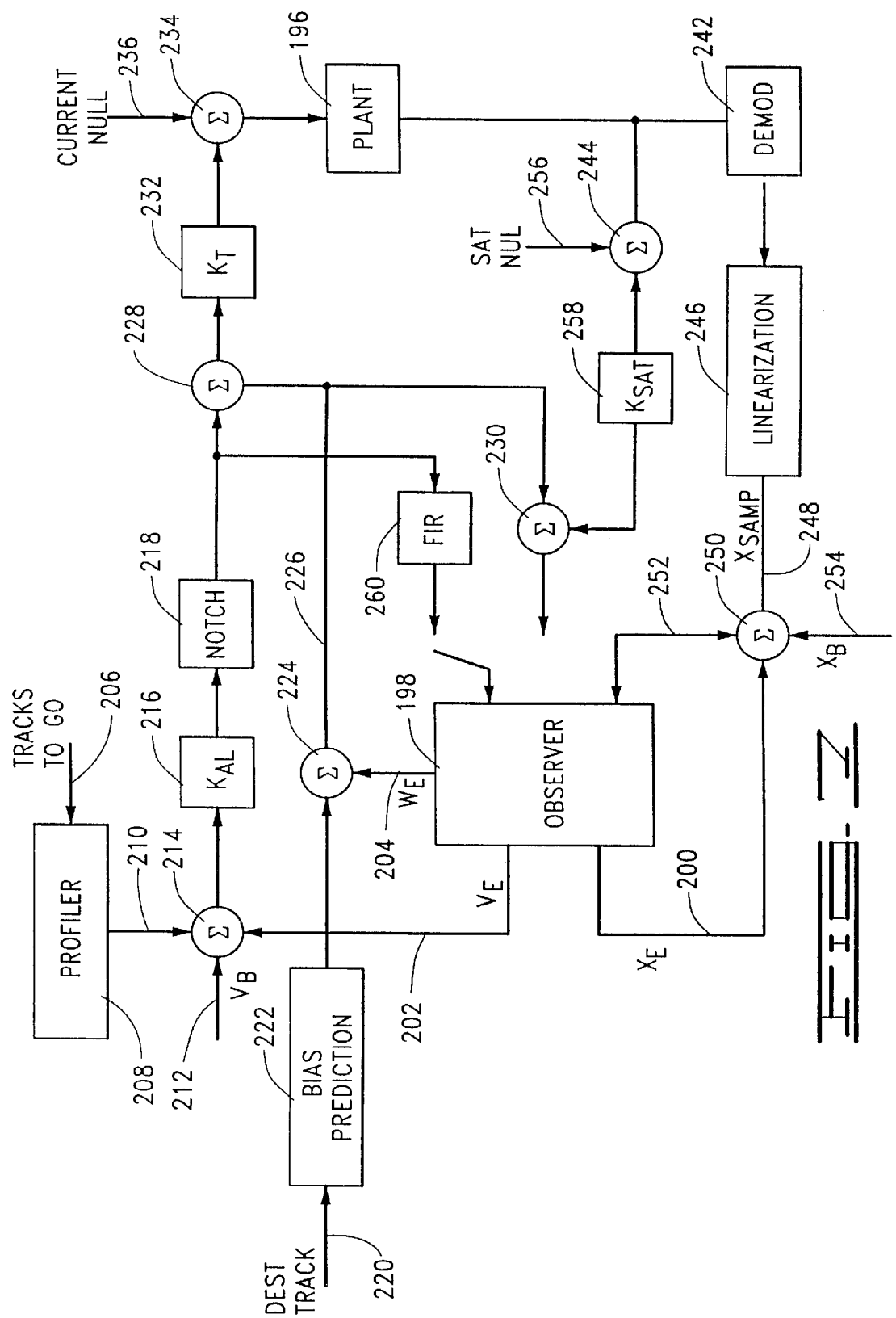

ACTIVE DAMPING OF ACTUATOR BEARING TRANSLATIONAL MODE

RELATED APPLICATIONS

This application claims priority to Provisional Application No. 60/141,614 filed Jun. 30, 1999.

FIELD OF THE INVENTION

This invention relates generally to the field of magnetic data storage devices, and more particularly, but not by way of limitation, to improving disc drive operational performance by detecting and canceling translational motion of the actuator due to actuator bearing deformation.

BACKGROUND

Disc drives are used as primary data storage devices in modem computer systems and networks. A typical disc drive comprises one or more rigid magnetic storage discs which are journaled about a rotary hub of a spindle motor to form a disc stack. An array of read/write transducing heads are supported adjacent the disc stack by an actuator to transfer data between tracks of the discs and a host computer in which the disc drive is mounted.

Conventional actuators employ a voice coil motor to position the heads with respect to the disc surfaces. The heads are mounted via flexures at the ends of a plurality of arms which project radially outward from an actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

The actuator voice coil motor includes a coil mounted on the side of the actuator body opposite the head arms so as to be immersed in the magnetic field of a magnetic circuit comprising one or more permanent magnets and magnetically permeable pole pieces. When current is passed through the coil, an electromagnetic field is set up which interacts with the magnetic field of the magnetic circuit to cause the coil to move in accordance with the well-known Lorentz relationship. As the coil moves, the actuator body pivots about the pivot shaft and the heads move across the disc surfaces.

The control of the position of the heads is typically achieved with a closed loop servo system such as disclosed in U.S. Pat. No. 5,262,907 issued to Duffy et al. and assigned to the assignee of the present invention. A typical servo system utilizes servo information (written to the discs during the disc drive manufacturing process) to detect and control the position of the heads through the generation of a position error signal (PES) which is indicative of the position of the head with respect to a selected track. The PES is generated by the servo system by comparing the relative signal strengths of burst signals generated from precisely located magnetized servo fields in the servo information on the disc surface.

The servo system primarily operates in one of two selectable modes: seeking and track following. A seek operation entails moving a selected head from an initial track to a destination track on the associated disc surface through the initial acceleration and subsequent deceleration of the head away from the initial track and toward the destination track. A velocity control approach is used whereby the velocity of the head is repeatedly estimated (based on measured position) and compared to a velocity profile defining a desired velocity trajectory for the seek. Corrections to the amount of current applied to the coil during the seek are made in relation to the difference between the estimated velocity and the desired velocity.

At such time that the head reaches a predetermined distance away from the destination track (such as one track away), the servo system transitions to a settling mode wherein the head is settled onto the destination track. Thereafter, the servo system enters a track following mode of operation wherein the head is caused to follow the destination track until the next seek operation is performed.

Disc drive designs thus typically use proximate time optimal control with a velocity profile to control a selected head during a seek, a state estimator based controller with relatively slow integration to settle the head onto the destination track, and the same state estimator based controller with relatively fast integration for track following.

Typically, disc drive designers have employed ball bearing cartridges for journaling the actuator assembly about the pivot point. These bearing assemblies are subject to very rapid, repetitive movements of the actuator arm about the pivot point as the heads are radially moved from track to track. The precision of seeking and track following operations is dependent upon the performance of the actuator bearing assembly. As the storage capacity of modern disc drives continues to increase, the precision required by the rotation of the actuator arm about the bearing assembly also increases.

Despite the requirements for precise movement, ball bearing assemblies are subject to mechanical limitations that can adversely affect their use in today's high-performance disc drives. More specifically, conventional ball bearing assemblies are subject to metal wear, increased vibrational resonance and friction, and lubricant outgassing. Each of these limitations increases the presence of extraneous motion exhibited by the ball bearing assembly during rotation.

In concert with these mechanical limitations, ball bearing assemblies also provide an undesirable translational degree of freedom in the X-Y plane (i.e. a plane intersecting the assemblies and normal to the axes about which the assemblies rotate). This translation is caused primarily by the deflection of the ball bearings within the inner and outer races of the bearing assembly. The deflection of the ball bearings results from a lateral force applied to the actuator during a seek or track following operation. During deflection, the ball bearings exhibit a "spring-like" response to the laterally applied force. The natural frequency of the resulting bearing translation is dependent on the mass of the actuator arm and the spring stiffness of the bearing assembly. This vibration mode is often referred to as the bearing translation mode.

A variety of solutions have been proposed to limit the presence of translational modes of vibration in disc drive actuator bearings. For instance, adding mass to the actuator arm tends to reduce the frequency of the bearing translational mode. U.S. Pat. No. 4,812,935 issued to Sleger teaches the limitation of bearing translational modes through use of mass dampers. However, adding mass to the actuator arm has the unwanted side effect of slowing seek operations and limiting servo bandwidth. Other proposed solutions include absorbing the vibratory energy through use of elastomeric components within the bearing assembly, as taught by U.S. Pat. No. 5,983,485 issued to Misso and assigned to the assignee of the present invention. Although absorption components may reduce translational vibration, the additional space required for installing these components is prohibitive in modern, compact disc drives.

In light of the deficiencies presented by the prior art solutions, there continues to be a pressing need to develop a compact means for limiting the presence of bearing translation while improving the overall performance of actuator movement.

SUMMARY OF THE INVENTION

The present invention provides an apparatus and method for improving the operational performance of a disc drive through the detection of a translational mode of vibration within a bearing assembly of the disc drive.

As exemplified by presently preferred embodiments, the disc drive includes a base deck supporting a rotatable disc and a rotary actuator. The actuator supports a head adjacent a recording surface of the disc and is controllably rotated about a bearing assembly by an actuator motor. A servo control circuit applies current to the actuator motor to position the head in relation to servo signals obtained from the disc recording surface.

A proximity probe, such as a capacitance probe, is provisioned adjacent the actuator, or inside the cartridge bearing assembly, and is used to detect extraneous movement of the actuator caused by a translation within the bearing assembly. The bearing translation signal can be representative of a deflection within the bearing assembly caused by the application of current to the actuator motor. Additionally, the bearing translation signal can be representative of an externally applied shock to the disc drive.

The proximity probe measures the bearing translation by monitoring the position of the actuator relative to a stationary component in the disc drive. The proximity probe outputs a bearing translation signal indicative of the direction and magnitude of the bearing translation. The bearing translation signal is used to compensate the servo control of the actuator motor for the disturbance caused by bearing translation.

These and other features and advantages which characterize the present invention will be apparent from a reading of the following detailed description and a review of the associated drawings.

BRIEF DESCRIPTION OF THE DRAWINGS

FIG. 5 is a functional block diagram of the disc drive of FIG. 1.

FIG. 6 is a functional block diagram of the servo circuit and probe components of FIG. 5.

FIG. 7 is a functional block diagram of a velocity controlled seek operation performed with regard to a bearing position signal and a bearing velocity signal.

FIG. 8 is a functional block diagram of a position controlled operation performed with regard to a bearing position signal and a bearing velocity signal.

DETAILED DESCRIPTION

Figure 1:
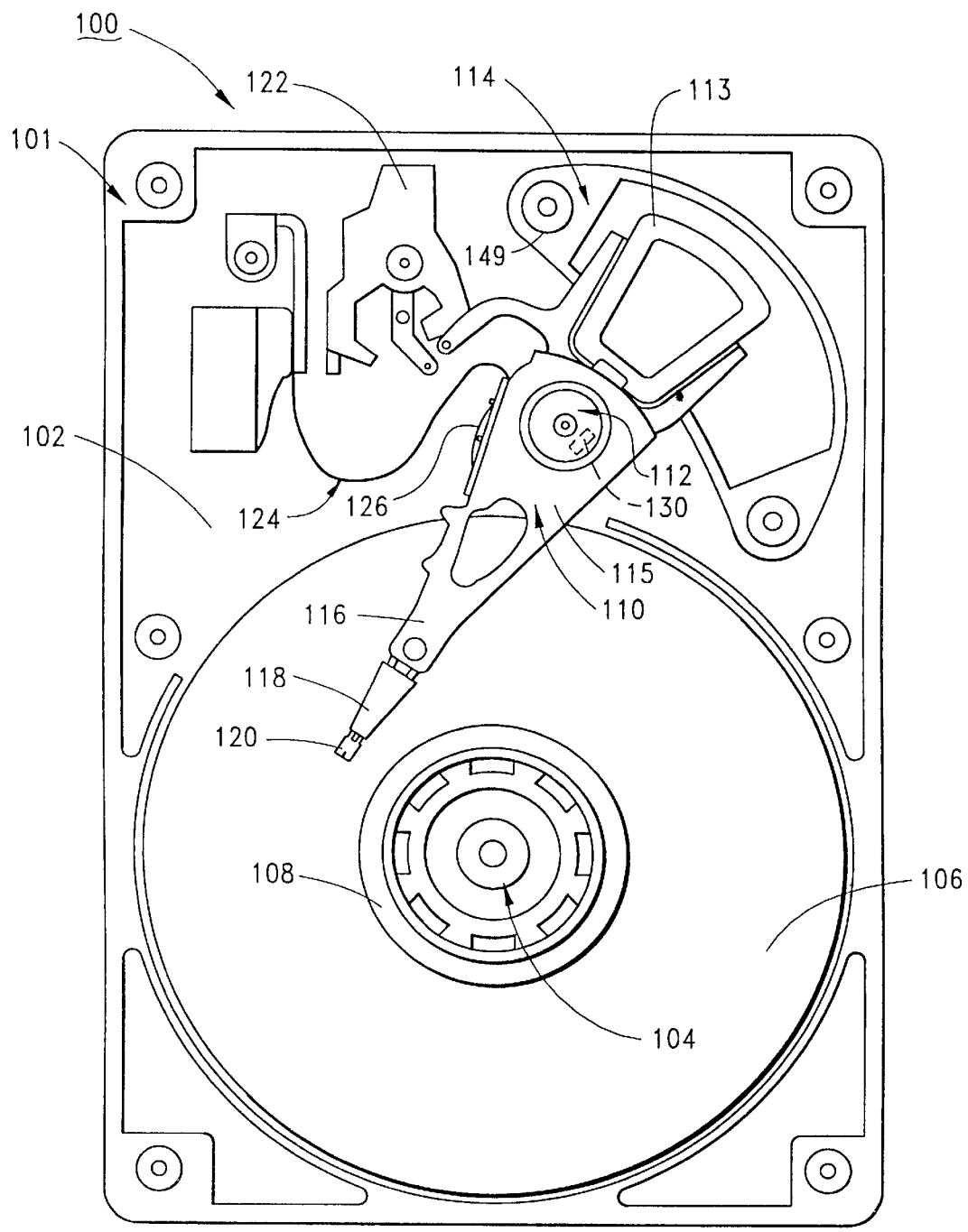
FIG. 1 is a top plan view of a disc drive constructed in accordance with a preferred embodiment of the present invention.

In order to set forth a detailed description of various presently preferred embodiments of the present invention, reference is first made to FIG. 1 which shows a top plan view of a disc drive 100 used to store computer data. The disc drive 100 includes a head-disc assembly (HDA) 101 and a printed wiring assembly (PWA) supporting control electronics used by the disc drive 100. The PWA is mounted to the underside of the HDA 101 and hence, is not visible in FIG. 1.

The HDA 101 includes a base deck 102 which supports a spindle motor 104 used to rotate a plurality of discs 106 at a constant high speed. Although not shown, it will be understood that tracks are defined on each of the disc surfaces using servo data written to the disc drive 100 during manufacturing in a conventional manner. A disc clamp 108 secures the discs 106 and a series of disc spacers disposed between adjacent discs (not visible in FIG. 1) to the spindle motor 104. A top cover (not shown) mates with the base deck 102 to provide a contained environment for the HDA 101.

A rotary actuator 110 is configured for pivotal rotation about a cartridge bearing assembly 112 (hereinafter referred to as "bearing assembly 112") supported by the base deck 102. An E-block 115 comprises the central portion of the actuator 110 and serves as the mount for a plurality of actuator arms 116. The plurality of actuator arms 116 project from the E-block 115 and support flexure assemblies 118 which, in turn, support a plurality of corresponding heads 120 over the surfaces of the discs 106. The actuator 110 is rotated through controlled application of current to an actuator coil 113 of a voice coil motor (VCM) 114.

A latch/stop assembly 122 secures the heads over texturized landing zones (not designated) at the inner diameters of the discs 106 when the disc drive is not in use and includes limit stops (not separately designated) to limit the radial extent (stroke) of the actuator 110. A flex circuit assembly 124 and a preamplifier/driver (preamp) 126 facilitate electrical communication between the actuator 110 and the disc drive PWA.

Figure 2:
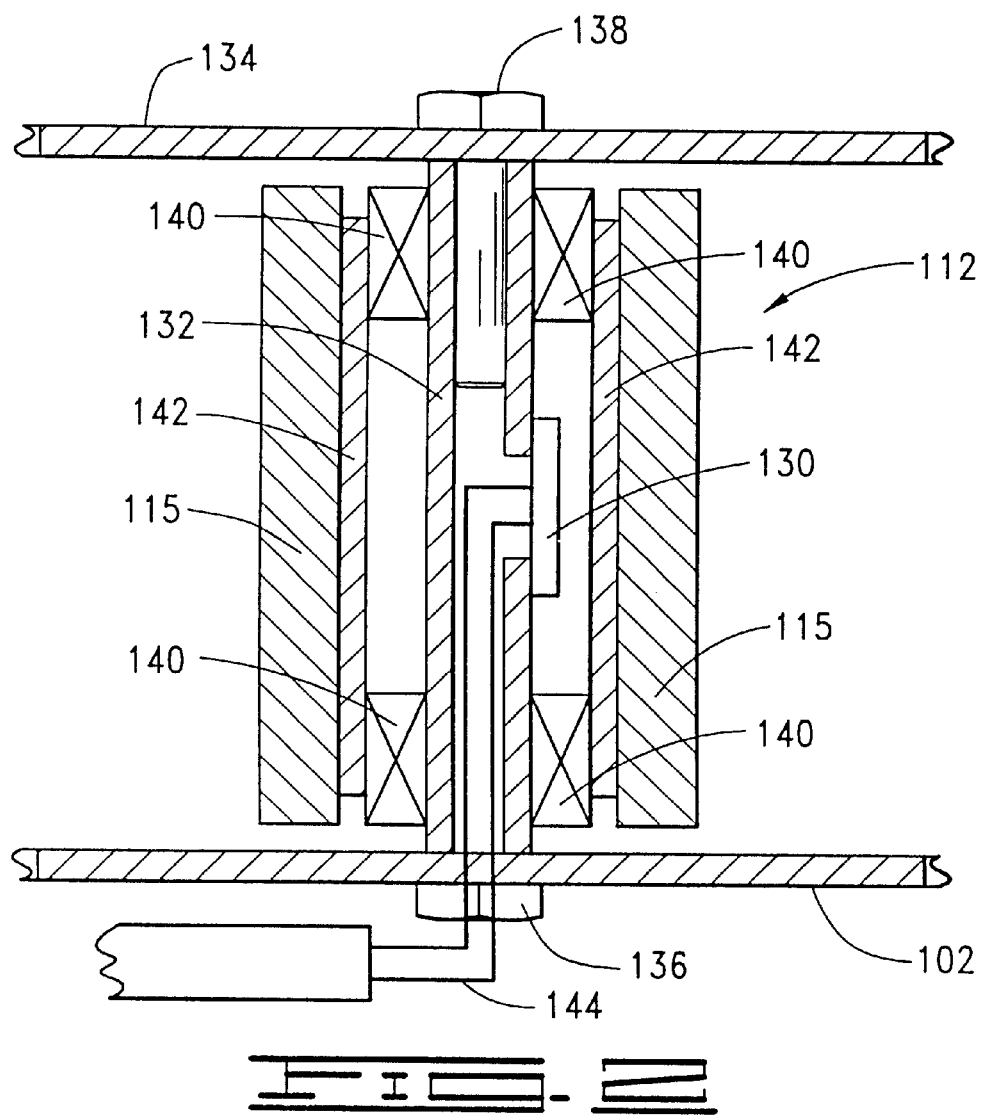
FIG. 2 is a side cross-sectional view of a bearing assembly constructed in accordance with a preferred embodiment of the present invention.

Now referring to FIG. 2, shown therein is a side cross-sectional view of the bearing assembly 112 and a preferred embodiment of a proximity probe 130. As discussed below, the proximity probe 130 is used to detect bearing translations. The bearing assembly 112 includes a stationary shaft 132 which is rigidly supported by a top cover 134 and the base deck 102. The stationary shaft 132 is affixed to the base deck 102 by a retaining nut 136. At the close of the fabrication process, a top screw 138 secures the stationary shaft 132 to the top cover 134. The stationary shaft 132 is annular having an outer diameter, an inner diameter and a height (not separately designated).

The bearing assembly 112 further comprises a plurality of ball bearings/race assemblies (hereafter referred to as "bearings 140") which are affixed to the outer circumference of the stationary shaft 132. FIG. 2 shows a preferred configuration of the bearings 140 about the stationary shaft 132 and includes two sets of bearings 140 disposed at substantially the top and bottom of the stationary shaft 132. Other configurations include, but are not limited to, placing additional sets of bearings 140 about the outer circumference of the stationary shaft 132. It will be understood that the bearings 140 comprise various known components including an inner race, an outer race, ball bearings and lubricants (not separately shown).

Continuing with FIG. 2 and the bearing assembly 112, an outer sleeve 142 is connected to the bearings 140 such that the outer sleeve 142 freely rotates about the stationary shaft 132 with limited vertical movement. The outer sleeve 142 is generally cylindrical and has inner and outer circumferences (not separately shown). There are numerous and well known means for connecting the moveable and fixed components of a bearing assembly. Often, the outer sleeve is held in place with a sufficiently strong compressive force that is generated by preloaded the outer sleeve. Other well known means include using retaining rings or chamfered inner and outer bearing races.

The outer circumference of the outer sleeve 142 is rigidly affixed to the E-block 115 in a conventional manner. An ordinarily skilled artisan will recognize that there are numerous and nonexclusive means for attaching the E-block 115 to the outer sleeve 142. Many designs employ laterally engaging retaining screws for securing the E-block to the bearing assembly. Alternative designs make use of strong adhesives or pressure fittings.

With continued reference to FIG. 2, shown therein is a preferred provision of the proximity probe 130 within the bearing assembly 112. In the embodiment depicted in FIG. 2, the proximity probe 130 is affixed to the outer circumference of the stationary shaft 132. As shown, the proximity probe 130 is disposed in the space provided by the bearings 140 between the outer sleeve 142 and the stationary shaft 132. A set of signal wires 144 create the electrical connection between the proximity probe 130 and the PWA (not numerically designated). The signal wires 144 are directed through an aperture in the stationary shaft 132 and run through the annular center of the stationary shaft 132.

In a preferred embodiment, the proximity probe 130 is a capacitance probe which outputs an analog voltage signal representative of a corresponding change in capacitance. The change in capacitance is induced by relative displacement of the proximity probe 130 relative to the outer sleeve 142. A suitable proximity probe 130 is model HPB-40 commercially available from Capacitec Inc., Ayer, Mass., USA.

The principle underlying proximity measurement through capacitance is based on detecting a change in the capacitance exhibited between a pair of ferromagnetic plates. The capacitance of a parallel plate capacitor can be determined using the following equation:

$$C = \frac{\varepsilon_0 \cdot A}{d} \quad (1)$$

where $\varepsilon_0$ represents the constant of permittivity of free space, A represents the area of the two parallel plates, d represents the distance of separation between the parallel plates and where C represents the capacitance exhibited by the parallel plate capacitor.

Equation (1) demonstrates that capacitance is inversely proportional to the distance between the parallel plates. The proximity probe 130 detects a change in the proximity of the outer sleeve 142 relative the stationary shaft 132 by measuring the capacitance held between the proximity probe 130 and the outer sleeve 142. The proximity probe 130 outputs a bearing translation signal ($B_T$ signal) having a magnitude and polarity indicative of a change in measured capacitance.

Figure 3:
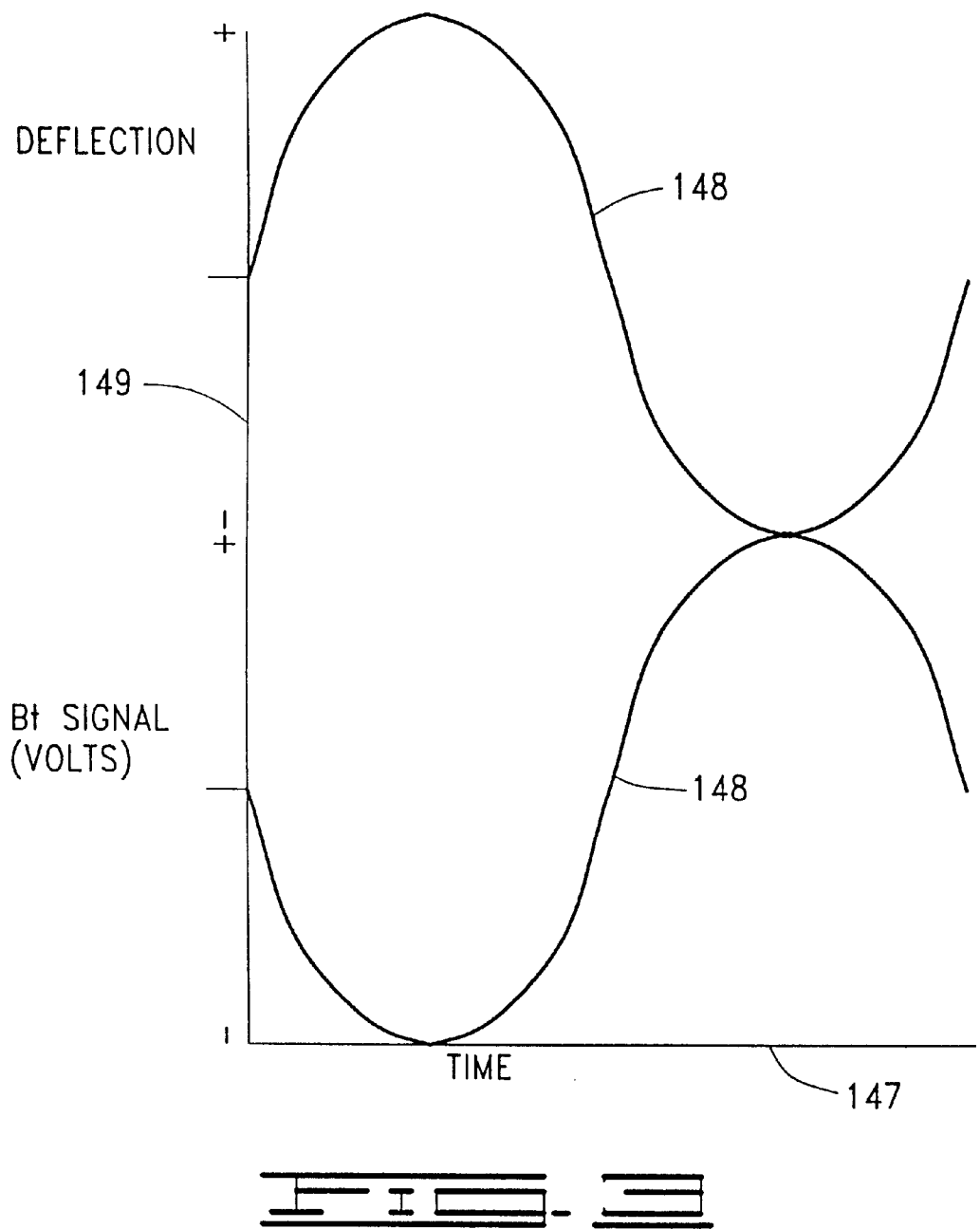
FIG. 3 is a graphical depiction of the output signal from a capacitance probe in response to a typical bearing displacement.

Turning now to FIG. 3, shown therein are graphical depictions of bearing deflection (curve 146) and $B_T$ signal output (curve 148) plotted against an elapsed time horizontal axis 147 and common vertical axis 149.

In a normal state, that is a bearing assembly 112 exhibiting no deflection, the magnitude of the $B_T$ signal output by the proximity probe 130 will be a nominal baseline value, such as zero (note the respective values of curves 146 and 148 at the beginning of the time period). If bearing deflection increases the distance between the outer sleeve 142 and the proximity probe 130, the proximity probe 130 outputs a $B_T$ signal having a negative polarity and a magnitude that is directly proportional to the increasing distance (see the first half of curves 146 and 148 respectively). When, on the other hand, the deflection causes the outer sleeve 142 to approach the proximity probe 130, the capacitance increases and the proximity probe 130 outputs a $B_T$ signal having a positive polarity and a magnitude that is directly proportional to the decreasing distance (see the second half of curves 146 and 148 respectively).

Figure 4:
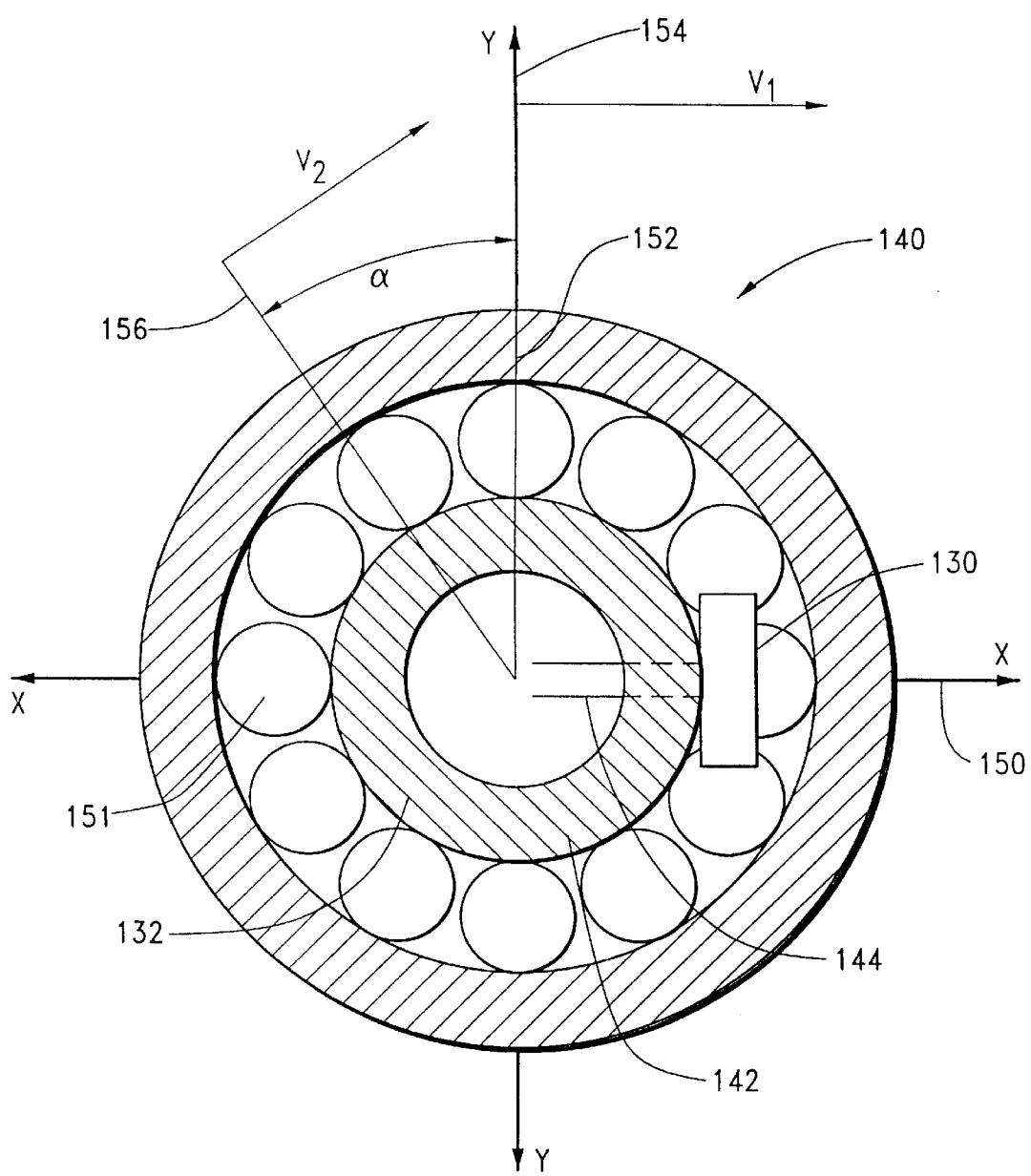
FIG. 4 is a top cross-sectional view of the bearing assembly of FIG. 2.

Turning now to FIG. 4, shown therein is a top cross-sectional view of the bearing assembly 112 and the proximity probe 130. The pictured cross-section is taken at a level flush with the placement of the proximity probe 130. As depicted in FIG. 4, the bearings 140 include a plurality of individual ball bearings (one denoted at 151) spaced about the outer circumference of the stationary shaft 132.

Because the proximity probe 130 measures a change in proximity in a direction normal to its face (illustrated by an x-axis 150), the amount of deflection registered by the proximity probe 130 varies with the angular position of the rotary actuator 110. In other words, during rotation of the rotary actuator 110, the proximity probe 130 registers only a single component of the two-dimensional vector representing total bearing deflection.

The application of current to the voice coil motor 113 creates a resultant force that is realized at the bearing assembly 112 and which acts substantially perpendicular to centerline of the actuator 110. Centerline axis 152 represents the rotary actuator 110 in a position in which the centerline axis 152 overlaps a y-axis 154 defined to be perpendicular to the x-axis 150. In the position represented by centerline 152, a deflection represented by a vector $V_1$ is comprised completely of x-axis coordinates. As such, the proximity probe 130 registers the entire deflection vector $V_1$.

In contrast, centerline 156 illustrates the position of the actuator at the limit of its angular rotation (stroke). The angle α represents one-half of the total stroke of the rotary actuator 110. In most applications, one-half of the total actuator stroke is approximately 15°. When the rotary actuator 110 is in a position represented by centerline 156, a deflection represented by a vector $V_2$ acts in a direction perpendicular to the centerline 156 and has both x axis and y axis components. Because the proximity probe 130 only registers the x-axis component of the deflection vector $V_2$, that portion of the deflection vector $V_2$ attributable to y-axis component is undetected.

Because the proximity probe only measures unidirectional bearing deflection, there is some error associated with the output of the proximity probe 130 as the rotary actuator 110 rotates away from the centerline 152. The maximum expected error can be approximated by determining the amount of bearing deflection not detected by the proximity probe 130. This error can be expressed mathematically through the following series of equations:

$$\frac{F - Fx}{F} = E \quad (2)$$

where F is the vector representing the total deflection, $F_x$ is the vector representing the x-axis component of the vector F and where E represents the percent error associated with detecting only the x-axis components of the total deflection. Using elementary trigonometric properties, it can be shown that:

$$Fx = F(\cos\alpha) \quad (3)$$

where α represents one-half of the total stroke of the rotary actuator 110. Substituting equation (3) into equation (2) provides the following equation:

$$\frac{F - F(\cos\alpha)}{F} = E \quad (4)$$

Reducing equation (4) yields the following expression:

$$1 - \cos\alpha = E \quad (5)$$

Substituting α with one-half of the total angular stroke of the rotary actuator 110 and solving for E gives the maximum expected error in the measurement of the proximity probe 130. In a typical disc drives, substituting α with 15° gives a percent error of 3.4%. In other words, there is a maximum difference between the actual bearing deflection and the bearing deflection registered by the proximity probe 130 of 3.4%. This limited error will generally be acceptable in most applications.

However, in some embodiments of the present invention, it may be desirable to take into consideration the angular position of the rotary actuator when measuring bearing deflection. A correction factor can be applied to the $B_T$ signal which takes into consideration the angular position of the rotary actuator 110 with respect to the proximity probe 130. The angular position of the rotary actuator 110 can be easily determined from the radial position of the head 120 using servo data located on the discs 106.

Now turning to FIG. 5, shown therein is a generalized functional block diagram of relevant portions of the disc drive 100 of FIG. 1, including circuitry disposed on the aforementioned disc drive PWA. The disc drive 100 is shown to be operably coupled to a host device 160 with which the disc drive 100 is associated. For example, the host device 160 can comprise a personal computer (PC).

A control processor 162 provides top level control of the operation of the disc drive 100 in accordance with programming and parameter values stored in dynamic random access memory (DRAM) 164 and flash memory 166. An interface circuit 168 includes a data buffer (not separately shown) for the temporary buffering of transferred data, and a sequence controller ("sequencer," also not separately shown) which directs the operation of a read/write channel 170 and the preamp 126 during data transfer operations. The preamp 126 is preferably mounted to the actuator 110, as shown in FIG. 1.

A spindle circuit 172 is provided to control the rotation of the discs 106 through back electromotive force (bemf) commutation of the spindle motor 104. A servo circuit 176 controls the position of the selected head 120 relative to the disc 106.

FIG. 6 provides a block diagram of the servo circuit 176 of FIG. 5, in conjunction with proximity probe circuitry to be described as follows. During disc drive operation, servo information stored to the discs 106 is supplied to an automatic gain control (AGC) block 178 which adjusts the input signal amplitude to a range suitable for remaining portions of the circuit. A demodulator (demod) 180 conditions the servo information, including analog-to-digital (A/D) conversion, and provides the same to a digital signal processor (DSP) 182.

In response to the servo information, commands provided by the control processor 162 (FIG. 5) and programming stored in DSP memory (MEM) 184, the DSP 182 outputs a current command signal to a coil driver circuit 186 which in turn applies a current $I_c$ to the voice coil 113 in order to position the selected head 120 relative to the tracks on the corresponding disc 106. With reference to both FIGS. 5 and 6, a primary servo path (or loop) is thus established by the head 120, preamp 126, AGC 178, demod 180, DSP 182, coil driver 186 and voice coil 113.

Additionally, FIG. 6 shows the proximity probe 130 to be operably connected to an amplifier (amp) 188, which outputs the $B_T$ (bearing translation) signal in relation to a measured change in proximity between the proximity probe 130 and outer sleeve 142. The $B_T$ signal is converted to digital form by way of an analog-to-digital (A/D) converter 190. The digital signal, representative of a translated bearing position (and accordingly designated as $X_B$), is provided to the DSP 182, as well as to a differentiator 192.

The $X_B$ signal is differentiated by a differentiator 192 and filtered by a lead-lag filter 194 to provide a bearing velocity signal $V_B$ to the DSP 182. A secondary, bearing velocity path is thus established by the proximity probe 130, amp 188, A/D 190, differentiator 192 and filter 194. For reference, at least the amp 188 will sometimes also be referred to as "proximity probe circuitry," as it is used to detect bearing translation in relation to the bearing translation voltage output by the proximity probe 130. However, it will be appreciated that other configurations of circuitry can readily be used to detect a bearing translation through use of a proximity probe 130, so that the circuitry of FIG. 6 is merely illustrative and is not limiting to the scope of the claims provided below.

Turning now to FIG. 7, shown therein is a functional block diagram representing the programming of the DSP 182 for carrying out velocity controlled seeks. Initially, FIG. 7 shows a plant block 196, representative of electrical and mechanical portions of the disc drive 100 including the VCM 114, the head 120 and the preamp 126. An observer 198, configured to provide a mathematical model of the operation of the plant 196, outputs estimates of head position, velocity and bias ($X_E$, $V_E$ and $W_E$) on respective paths 200, 202 and 204. Bias is representative of forces that tend to move the head 120 off-track, such as windage effects from the air currents established by the rotation of the discs 106 and spring forces from the flex circuit 124. Bias will often be position dependent.

During a seek, the number of tracks to go is input on path 206 to a profiler 208. As discussed above, the tracks to go is the physical distance remaining in the seek and is determined in relation to the difference between the position of the head 120 and the location of the destination track. In response, the profiler outputs the appropriate demand velocity on path 210 through, for example, interpolation techniques or from values stored in a look-up table. The bearing velocity signal $V_B$ from is output along signal path 212 to a summing junction 214. The difference between the demand velocity, the estimated velocity $V_E$ and the bearing velocity signal $V_B$ is determined using summing junction 214. It will be understood that the polarity of the bearing translation velocity $V_B$ signal depends on whether the translation increases or decreases the distance between the outer sleeve 142 and the proximity probe 130. This difference from summing block 214 is referred to as velocity error and is provided to gain block 216 having gain $K_{AL}$ to carry out an acceleration limiting function and then through a notch filter 218. At the same time, the destination track location is provided on input path 220 to a bias prediction block 222, which predicts an amount of bias which is summed with the estimated bias at summing junction 224. The output on path 226 is summed at the summing junction 228 with the output from the notch filter 218, as well as a second summing junction 230, to be discussed shortly.

The output of the summing junction 228 is provided to a gain block 232 having gain $K_T$, used to compensate for nonlinear torque characteristics of the VCM 114. The output is summed at summing junction 234 with a current null signal on path 236, used to null out current. The resulting signal on path 238 comprises a current demand signal which is provided to the plant 196 to adjust the position of the selected head 120.

In response, the plant provides a sense output on path 240; servo data are provided to a demodulation (demod) block 242 and current level is provided to summing junction 244. After demodulation, the servo data are linearized using linearization block 246 to give a position sample $X_{SAMP}$ on path 248, which is differenced at summing junction 250 with the position estimate $X_E$ to provide an observer error $O_{ERR}$ on path 252. Also summed at summing block 250 is the bearing position signal $X_B$ output by the A/D 190 along signal path 254. In this manner, the operation of the observer 198 is maintained nominally that of the plant 300 while taking into consideration the $X_B$ signal. It will be understood to one of ordinary skill in the art that, although "summed" at summing block 250, the polarity of the bearing position signal $X_B$ signal varies with specific bearing deflection.

The current input to the summing junction 244 is used for saturation compensation and is accordingly summed with a saturation null input from path 256. Gain block 258 applies a saturation gain $K_{SAT}$ and the output is differenced with the bias sum from path 230. Finite response filter (FIR) block 260 provides the desired time delay to the output of the notch filter 218, so that the observer 198 receives a switched input from either the FIR 260 or the saturation loop, depending upon whether the coil is in saturation.

Accordingly, when large changes in current are applied to the VCM coil 113 during a seek to quickly accelerate and decelerate the head 120, provision of the $X_B$ and $V_B$ signals to the DSP 182 enables the servo circuit 176 to compensate for the resulting bearing translation.

Now turning to FIG. 8, shown therein is a functional block diagram of the programming of the DSP 182 during a position controlled, or track following operation. A plant block 262 is presented representative of selected electrical and mechanical aspects of the disc drive 100. For reference, the plant 262 generally includes portions of the primary loop established by the servo circuit 176 (see FIG. 6). The plant block 262 receives as an input a current command ($I_{CMD}$) signal on path 264 and, in response, outputs a position error signal (PES) on path 266 indicative of positional error in the selected head 120.

FIG. 8 further shows an observer (OBS) block 268, which generally provides a mathematical model of the plant 262 and periodically outputs estimates of head position ($X_E$), velocity ($V_E$) and bias ($W_E$) on paths 270, 272 and 274, respectively (similar to the observer 198 in FIG. 8). As before, bias will be understood as indicative of forces that tend to move the heads away from a selected position, such as spring forces applied by the flex circuit 124 (FIG. 1) and windage effects caused by air currents set up by the rotation of the discs 106.

The $X_E$ on path 270 is summed at a summing junction 276 with a reference position (indicative of desired head position) and with the bearing position signal $X_B$ output by the A/D 190 along signal path 254. The output from summing junction 276 on path 278 is applied to a position gain block 280 having gain $K_x$. The Ve signal is summed with the bearing velocity signal $V_B$, output by the lead-lag filter 194 along signal path 212, at summing junction 282. The output of summing junction 282 applied to a velocity gain block 284 having gain $K_v$. The outputs of the position and velocity gain blocks 280, 284 are brought to a summing junction 286 by way of paths 288, 290, respectively. The output (on path 292) is summed at a summing junction 294 with the $W_E$ from path 274 to generate the $I_{CMD}$ signal on path 402.

The output on path 292 is further applied to gain block 296 and fed to the observer 268. It will be noted that the sign designation for the various inputs to the summing junctions 276, 282, 286 and 294 have been generally arbitrarily assigned and could be modified with corresponding changes in polarity of the respective signals. Moreover, it will be understood that the polarity of the bearing position $X_B$ and bearing velocity $V_B$ signals vary with specific translational modes.

Accordingly, during disc drive operation the bearing position $X_B$ and bearing velocity $V_B$ signals are generated on a steady-state basis and provided to the servo circuit 176 to minimize the effects of bearing translation upon the disc drive 100 during track following.

Figure 9:
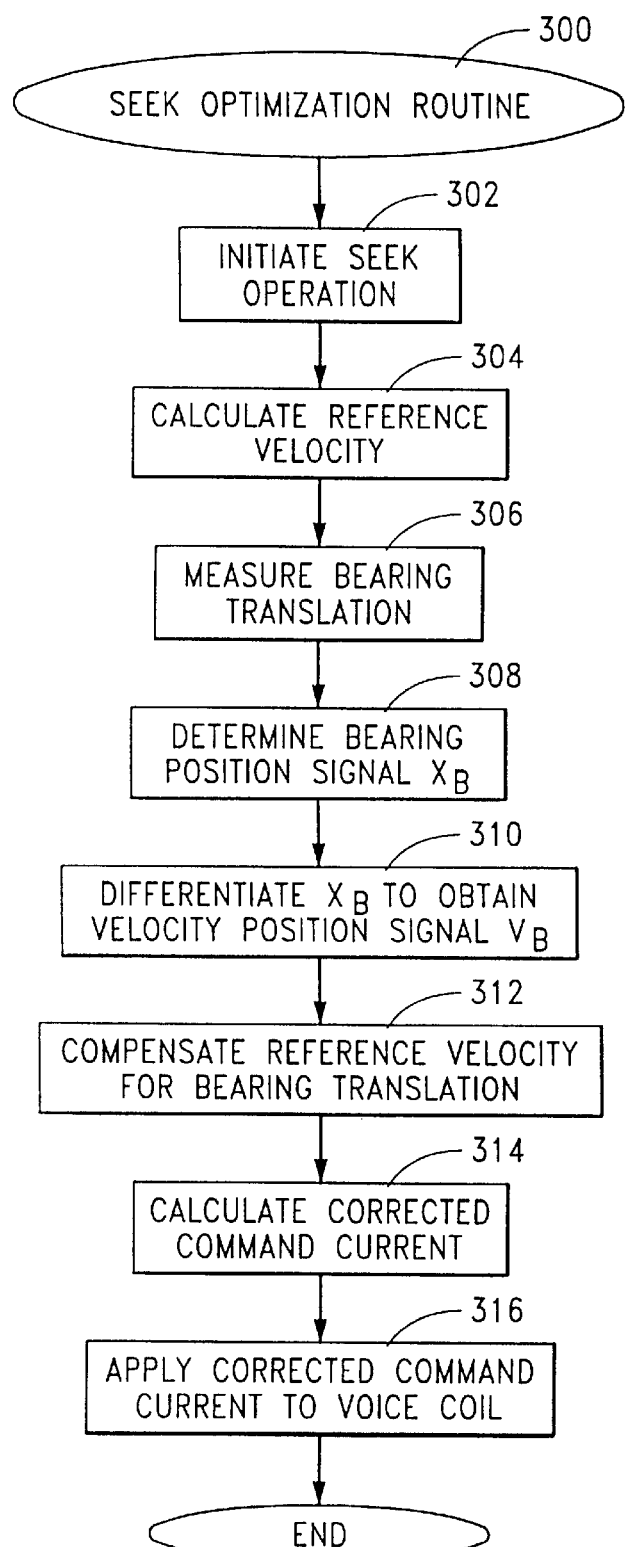
FIG. 9 is a process flow diagram of the velocity controlled seek operation shown in FIG. 7.
Figure 10:
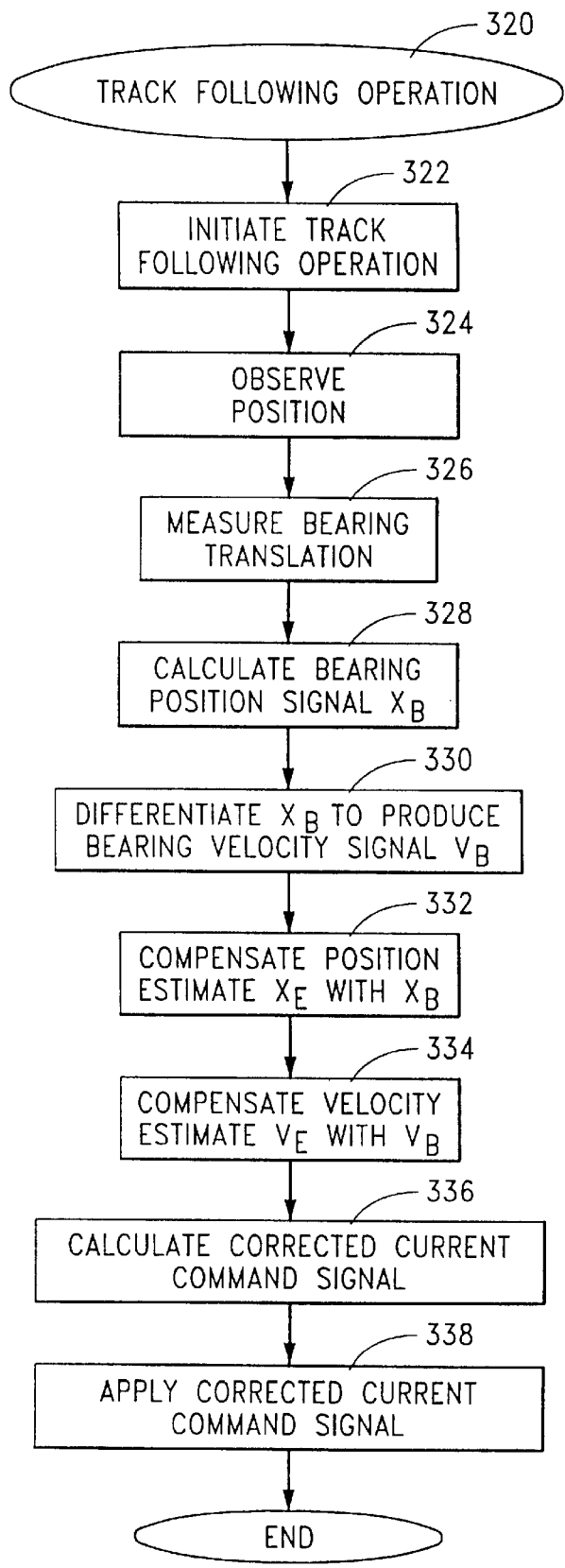
FIG. 10 is a process flow diagram of the position controlled operation of shown in FIG. 8.

To further explain the interrelated operation of proximity probe 130 and the servo circuit 176, FIGS. 9 and 10 respectively show seek and track following optimization routines.

Turning now to FIG. 9, shown therein is a seek optimization routine 300. The seek optimization routine 300 begins at step 302 with the initiation of a seek routine. At step 304, the profiler 208 calculates a reference velocity from the tracks to go signal 206. Once the seek is in motion, step 306 shows that the proximity probe 130 registers translation present within the bearing assembly 112 and outputs the bearing translation $B_T$ signal indicative of the direction and magnitude of the bearing translation. At step 308, the $B_T$ signal is sent through the A/D 190 to produce the bearing position $X_B$ signal which is then sent to the DSP 182 along signal path 254 and also to the differentiator 192.

Next, at step 310, the $X_B$ signal is differentiated with respect to time and filtered by the lead-lag filter 194 to produce the bearing velocity $V_B$ signal output to the DSP 182 along signal path 212. The bearing velocity $V_B$ and bearing position $X_B$ signals are used to compensate the reference velocity for the presence of bearing translation at step 312. More specifically, the bearing velocity $V_B$ signal is summed with the Ve output from the observer 198 and with the updated reference velocity from the profiler 208. The bearing position $X_B$ is summed with the position output from the plant 196 and sent to the observer 198. In this way, the bearing position signal $X_B$ affects reference velocity by altering the Ve output from the observer 198.

Once the reference velocity has been compensated for bearing translation, a corrected command current is calculated at step 314. At step 316 the corrected command current is applied to the voice coil 113 of the voice coil motor 114. It will be understood that the seek optimization routine 300 operates on a steady state basis and serves to decrease seek time by reducing the amount of time required to settle the head 120 on a specific track in the presence of bearing translation.

Turning now to FIG. 10, shown therein is a track following optimization routine 320. The track following optimization routine 320 begins at step 322 with the initiation of a track following operation. As mentioned above, the track following operation is used after settling the head 120 onto a selected track of the disc 106. The track following operation begins at step 324 by estimating the position (Xe), velocity (Ve) and bias (We) through use of the observer 268. At step 326, the proximity probe 130 measures bearing translation and outputs the bearing translation $B_T$ signal. While the proximity probe 130 is used to measure bearing translation in the presently preferred embodiment, it will be understood that alternative methods and devices for measuring bearing translation exist and are considered applicable to the present optimization routine. Next, at step 328, the proximity probe circuitry (amp 188, A/D 190) calculates the bearing position signal $X_B$. The bearing position signal $X_B$ is sent to the DSP 182 along signal path 254 and also to the differentiator 192. At step 330, the $X_B$ signal is differentiated with respect to time to produce the bearing velocity signal $V_B$. The bearing velocity signal $V_B$ is output to the DSP 182 along signal path 212.

The track following optimization routine 320 continues at step 332 where the position estimate signal Xe output from the observer 268 is summed with the bearing position signal $X_B$ to produce a compensated position signal. Likewise, at step 334, the velocity estimate signal Ve is summed with the bearing velocity signal $V_B$ to produce a compensated velocity signal. The compensated position and velocity signals are used to calculate a corrected command current at step 336. Finally, at step 338, the corrected command current is applied to the voice coil 113 of the voice coil motor 114.

Typically, the head velocity is kept relatively low during a track following operation. As such, the amount of command current being applied to the voice coil motor 114 will also be relatively low. Therefore, the presence of bearing deflection during a track following operation is more likely the result of an externally applied mechanical shock to the disc drive 100 than from the application of command current to the voice coil motor 114. The track following optimization routine 320 is performed on a steady-state operation to enable a track following operation which is more resistant to externally applied mechanical shocks.

Figure 11:
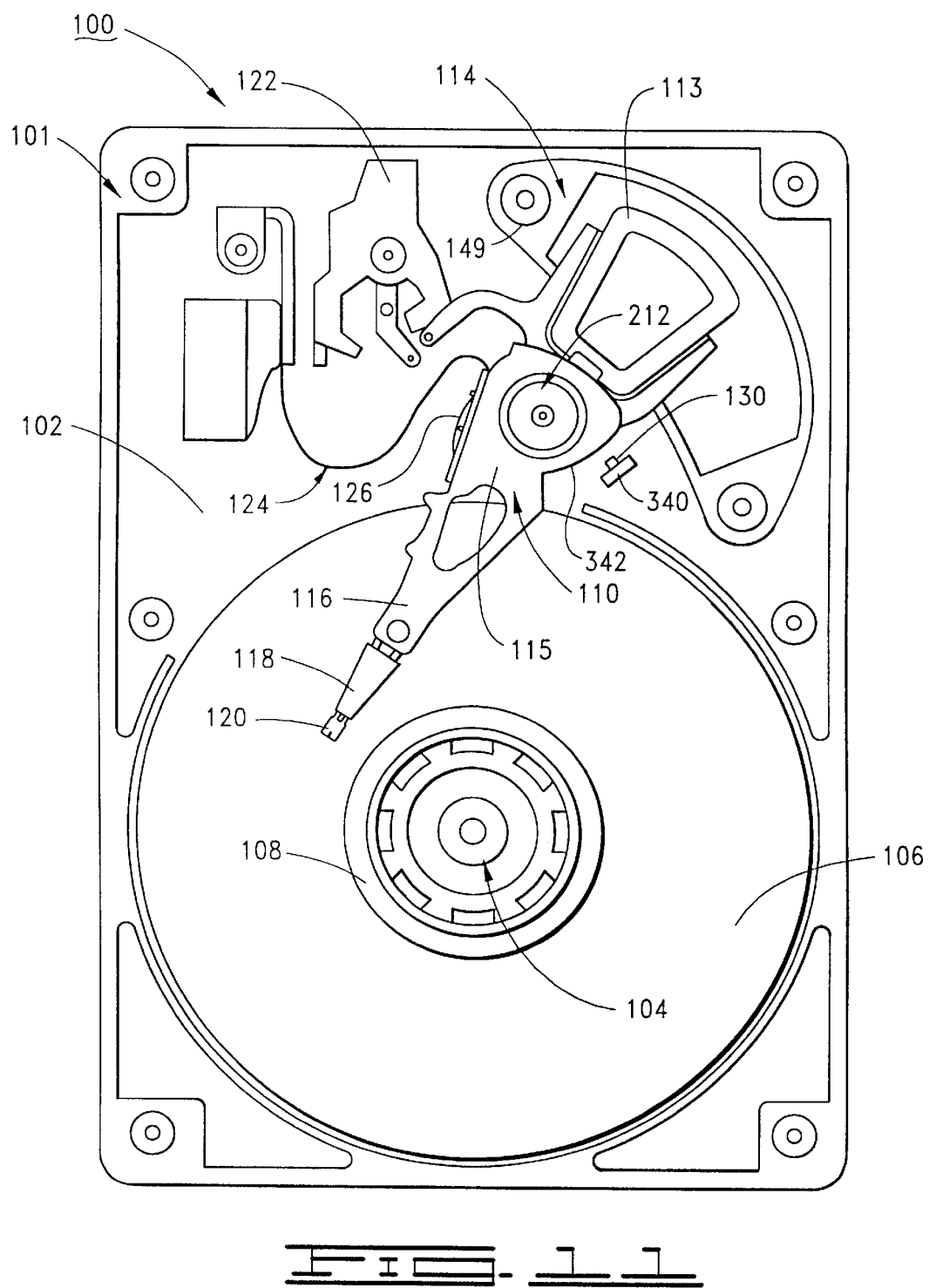
FIG. 11 is a top plan view of a disc drive constructed in accordance with an alternate preferred embodiment of the present invention.

In a preferred embodiment of the present invention, the proximity probe 130 is provisioned adjacent the stationary shaft 132 of the bearing assembly 112 (see FIGS. 2 and 4). However, alternate configurations of the proximity probe 130 relative the bearing assembly 112 exist and are contemplated as within the scope of the present invention. For example, FIG. 11 provides a top plan view of a disc drive 100 showing an alternate embodiment of the present invention in which the proximity probe 130 is located external to the bearing assembly 112. The proximity probe 130 is mounted on a mounting bracket 340 which is rigidly affixed to the base deck 102.

To ensure proper measurement of bearing translation as the rotary actuator 110 sweeps through a plurality of angular positions, a rounded face 342 is included on the side of the E-block 115 closest to the proximity probe 130. As the rotary actuator 110 pivots about the stationary shaft 132, the rounded face 342 remains in constant proximity with the proximity probe 130. As such, any change in the proximity between the rounded face 342 and the proximity probe 130 is attributable to bearing translation. All other aspects of the alternate embodiment shown in FIG. 11, including the proximity probe 130 operation and interrelation to the servo circuit 176, are identical to those disclosed in reference to the first described embodiment of the present invention.

From the foregoing discussion, it will be clearly understood that the present invention is directed to a proximity probe 130 and associated method for improving servo control in a disc drive. As exemplified by presently preferred embodiments, a disc drive 100 includes a rotary actuator 110 supporting a head 120 adjacent a rotatable disc 106 and an actuator coil 113 immersed in a magnetic field of a voice coil motor 114.

A bearing assembly 112 is used to pivot the actuator 110 and a proximity probe 130 is provisioned adjacent the bearing assembly 112 and generally comprises a stationary shaft 132, a plurality of bearings 140 and an outer sleeve 142. A proximity probe 130 is used to register a change in the position of the outer sleeve 142 relative the stationary components (i.e. the stationary shaft 132 or base deck 102) of the disc drive 100. In response to a change in the relative position of the outer sleeve 142, the proximity probe 130 outputs an analog bearing translation signal $B_T$ representative of the direction and magnitude of the translation.

The proximity probe 130 includes proximity probe circuitry which generates a bearing position signal $X_B$ and a bearing velocity signal $V_B$ used to enhance the performance of the servo circuit 176. The servo circuit 176 applies current to the actuator coil to position the head relative to the disc recording surface in relation to servo information transduced by the head, as well as in relation to the $X_B$ and $V_B$ signals.

For purposes of the appended claims, the terms "circuit" and "block" will be understood to be realize in either hardware or software, in accordance with the foregoing discussion. The phrase "host device" will be understood to describe any device which communicates with the claimed disc drive, such as, but not limited to, the personal computer discussed above. Although method steps have been set forth in a particular order, such ordering is not necessarily limiting to the scope of the claims.

It will be clear that the present invention is well adapted to carry out the objects and attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A disc drive comprising:

a recordable disc upon which a plurality of tracks are radially defined;

a rotary actuator having an E-block which supports a head adjacent the disc;

a bearing assembly having a stationary shaft and a bearing sleeve journaled about the shaft, wherein the bearing sleeve is rigidly affixed to the E-block so that the actuator rotates about the bearing assembly;

a proximity probe disposed adjacent the E-block that generates a bearing translation signal representative of a change in the proximity of the E-block relative to the proximity probe;

an actuator motor coupled to the actuator; and a servo control circuit which applies current to the actuator motor to position the head in relation to servo signals generated as the head reads servo data stored on the disc, wherein the servo circuit further adjusts the current applied to the actuator motor in response to the bearing translation signal.

2. The disc drive of claim 1, wherein the proximity probe is disposed adjacent the stationary shaft within the interior of the bearing assembly.

3. The disc drive of claim 1, wherein the proximity probe is affixed to a mounting bracket disposed external to the bearing assembly.

4. The disc drive of claim 3, wherein the E-block has a detection face which, in the absence of bearing translation, provides a constant proximity between the E-block and proximity probe during rotation of the rotary actuator.

5. The disc drive of claim 1, wherein the proximity probe comprises a capacitance probe.

6. The disc drive of claim 1, wherein the bearing translation signal is determined in relation to an error associated with measuring the bearing translation as the angular position of the rotary actuator changes during operation.

7. The disc drive of claim 1, wherein the servo control circuit is configured to carry out a seek operation by applying seek current to the actuator motor to move the head from an initial track to a destination track, wherein the seek current is determined in relation to the bearing translation signal.

8. The disc drive of claim 7, wherein the bearing translation signal is differentiated with respect to time to provide a bearing velocity signal and wherein the seek current is determined in relation to the bearing velocity signal.

9. The disc drive of claim 1, wherein the servo control circuit is configured to carry out a track following operation by applying track following current to the actuator motor to maintain the angular position of the rotary actuator, wherein the track following current is determined in relation to the bearing translation signal.

10. The disc drive of claim 9, wherein the bearing translation signal is differentiated with respect to time to provide a bearing velocity signal and wherein the track following current is determined in relation to the bearing velocity signal.

11. In a disc drive having a rotatable disc on which a plurality of tracks are defined, a rotary actuator which supports a head adjacent the disc, an actuator motor which rotates the actuator, a bearing assembly having a stationary shaft about which is journaled the rotary actuator, and a proximity probe disposed adjacent the bearing assembly that generates a bearing translation signal representative of a change in the proximity of the bearing assembly, a method for controlling the position of the head with respect to the disc, comprising steps of:

(a) generating a base current command signal indicative of current to be applied to the actuator motor to position the head in a desired relation to the disc;

(b) using the proximity probe to generate a bearing translation signal having a magnitude and direction indicative of a translation within the bearing assembly;

(c) combining the base current command signal and the bearing translation signal to generate a modified current command signal; and (d) applying current to the actuator in response to the modified current command signal to position the head with respect to the disc.

12. The method of claim 11, wherein step (b) further comprises using the bearing translation signal to produce a bearing position signal and bearing velocity signal.

13. The method of claim 12, wherein step (c) further comprises combining the base current command signal with the bearing position signal and the bearing velocity signal.

14. The method of claim 11, wherein the method comprises a prior step of affixing the proximity probe to the stationary shaft within the interior of the bearing assembly.

15. The method of claim 11, wherein the method comprises a prior step of affixing the proximity probe to a mounting bracket disposed external to the bearing assembly.

16. The method of claim 11, wherein the proximity probe comprises a capacitance probe.

17. A disc drive comprising:

a rotary actuator having an E-block which rotates about a stationary shaft; and means for detecting and compensating for a change in the distance between the E-block and the stationary shaft.

* * * * *